United States Patent [19]
Geduld

[11] Patent Number: 5,831,551
[45] Date of Patent: Nov. 3, 1998

[54] SYSTEM FOR TRAFFIC INFORMATION ACQUISITION IN VEHICLES

[75] Inventor: Georg Otto Geduld, Eichberg, Switzerland

[73] Assignee: LEICA Geosystems AG, Heerbrugg, Switzerland

[21] Appl. No.: 718,443

[22] PCT Filed: Apr. 6, 1995

[86] PCT No.: PCT/EP95/01253

§ 371 Date: Oct. 9, 1996

§ 102(e) Date: Oct. 9, 1996

[87] PCT Pub. No.: WO95/29471

PCT Pub. Date: Nov. 2, 1995

[30] Foreign Application Priority Data

Apr. 21, 1994 [DE] Germany ............. 44 13 886.5

[51] Int. Cl.$^6$ ............................. G08G 1/09
[52] U.S. Cl. ............... 340/905; 340/903; 340/904; 180/169; 359/152; 359/169; 359/170
[58] Field of Search ............. 340/905, 903, 340/904, 438, 435, 825.04, 825.54, 825.55; 180/169; 359/152, 169, 170

[56] References Cited

U.S. PATENT DOCUMENTS 3,892,483 7/1975 Saufferer ..................... 340/903
4,325,146 4/1982 Lennington ............... 455/604
5,062,088 10/1991 Davidson et al. .......... 367/127
5,122,796 6/1992 Beggs et al. ............... 340/904

FOREIGN PATENT DOCUMENTS

| 0 312 524 | 4/1989 | European Pat. Off. . |
| 32 48 544 | 7/1984 | Germany . |
| 33 19 158 | 11/1984 | Germany . |
| 41 34 601 | 4/1993 | Germany . |
| 41 38 050 | 5/1993 | Germany . |

*Primary Examiner*—Jeffery A. Hofsass
*Assistant Examiner*—Julie Lieu
*Attorney, Agent, or Firm*—Foley & Lardner

[57] ABSTRACT

The invention concerns traffic information acquisition systems for vehicles, which systems have a first opto-electrical transceiver on the vehicle side and a second opto-electrical transceiver provided at predetermined locations in traffic lanes. The first transceiver emits a first signal and receives and decodes a second signal from the second transceiver. The second transceiver receives the first signal from the first transceiver and sends back a coded, second signal to the first transceiver. The first transceiver is in the form of a reflection-operating time-distance measuring device. The emitted optical distance-measuring pulse signal is simultaneously the signal received by the second transceiver. The second transceiver emits the second signal after a delay time following reception of the first signal. The delay time should be longer than the maximum amount of time required for a distance measurement. It is thereby ensured that a signal from the second transceiver is not erroneously interpreted as a signal reflected by a target.

3 Claims, 3 Drawing Sheets

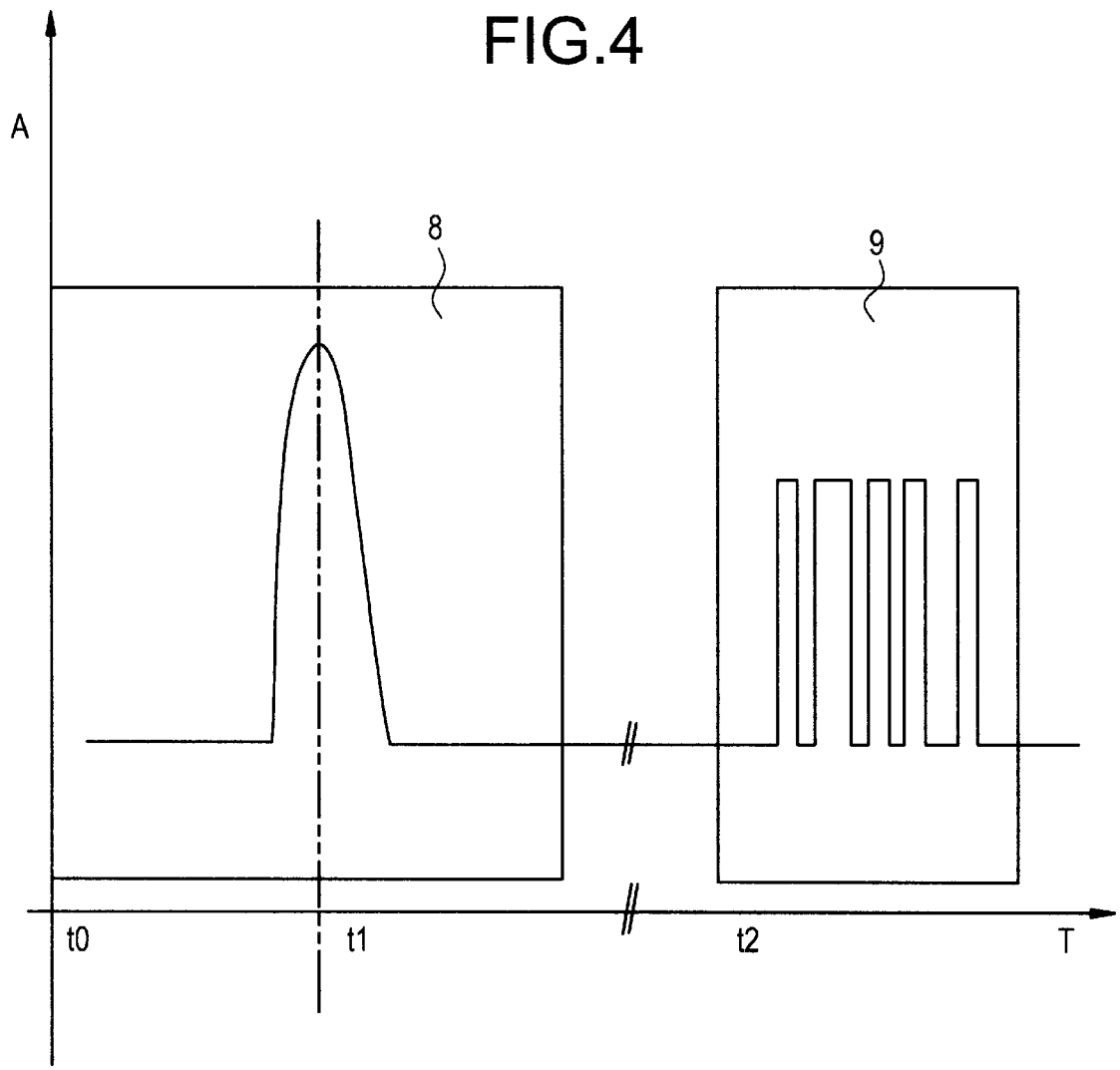

SYSTEM FOR TRAFFIC INFORMATION ACQUISITION IN VEHICLES

BACKGROUND OF THE INVENTION

The present invention relates to a system for acquiring traffic information in vehicles.

Such a system is known from DE-A-4138050 which essentially discloses an active transceiver for emitting an interrogation signal, in particular a radio-frequency interrogation signal, and for the reception and for the decoding of a reply signal. The interrogation signal is picked up by a passive transceiver, in which this signal is encoded. The encoded signal which is received by the active transceiver is decoded and utilized for identification purposes.

In the case of this known system, the active transceiver is located in a vehicle, while the passive transceiver is provided at predetermined points in traffic lanes. By means of interrogating the passive transceiver, information relating to the traffic can be interrogated. For instance, a traffic sign at the edge of the street can be provided with a passive transceiver which contains the information that there is a speed restriction of 60 km/h at a distance of 100 meters.

DE-A-4134601 discloses a method and devices for the transfer of information to the car driver. This information relates to the respective speed limitation and may contain additional communications about the state of the street and other potential dangers. The communication can be carried out both optically and acoustically and, depending on the hazard situation, may increase in intensity. The possibility of an intervention in the operation of the motor vehicle engine is also considered.

A system for transmitting information by means of infrared radiation using information data which is modulated on is known from DE-A-3248544. The transmission of information is carried out between stationary beacons and moving vehicles, each of which has a transmitter/receiver combination. The vehicle has at least two differently aligned transmitter/receiver combinations. At least two beacons fitted at different locations are provided, so that at least two differently aligned transmission paths are formed. The transmitters are connected in parallel and transmit the same data simultaneously. The receivers are connected in parallel on the output side and are configured in such a way that if interference signals lie above a predetermined interference signal threshold, the respective receiver is blocked.

DE-A-3319158 contains a description of a system for the transmission of information between an interrogation station and a reply station by means of optical radiation. An interrogation signal is emitted by the interrogation station and has applied to it a modulation, in part at a fixed frequency, in part with information code, and said signal is on the one hand received and evaluated by the reply station and on the other hand reflected back as reply signal and subjected to a modulation. The release of the back-reflection of the interrogation signal is in this case controlled as a function of the evaluation of an identifier contained in the interrogation signal. The instant of the release is controlled by means of an encoding contained in the interrogation signal, which encoding indicates the end of the transmitted message. Then, at the beginning of the back-reflection, a confirmation signal, for example an unchanged reflection of the encoding of the interrogation signal, is transmitted first. By means of this confirmation signal, the interrogation station is automatically controlled to a fixed frequency and/or fixed encoding. This produces the ready-to-reply state. In the reply station, means are provided for recognizing the fixed frequency or fixed encoding of the interrogation signal and for setting an operational readiness, tuned to this fixed clock, of the modulator of the reply station.

In the publication EP-B-0312524 a method is described for distance measurement between a transceiver for optical pulse signals and a target, by means of sending out optical pulse signals, the method being based on the principle of propagation time measurement. After the reflected signal has arrived at the transceiver, the received optical signals are converted into digital electric signals and subsequently processed. A semi-conductor laser is used as transmitter, with which pulses having a pulse train frequency in the range between about 10 kHz and about 150 kHz are directed at the target. The signal train reflected from the target and received is sampled and digitized using a sampling frequency which depends on the transmitted pulse train frequency. The sampling interval is restarted when each pulse is emitted. The received, digitized sampled values within one sampling interval are read into a parallel adder at the clock rate of the sampling frequency and are stored during the first sampling interval. The sampled values of the directly following second sampling interval are continuously added to the already available corresponding sampled values at the clock rate of the sampling frequency. At each sampling instant, instead of the respectively previous sampled value, the respectively obtained sum value is now stored. The sampled values of each further sampling interval are continuously added to the already available corresponding sum value at the clock rate of the sampling frequency. The newly obtained sum value at each sampling instant of the sampling interval is stored instead of the previous sum value. The distance information is derived from the resulting sum signal, following the addition of in each case N sampled values per sampling instant. This method is essentially based on the use of the knowledge that, by means of the use of N pulses, according to the rules of information theory, the sensitivity of the measurement method can be improved by the factor of the square root of N.

SUMMARY OF THE INVENTION

The invention is based on the object of developing a system of the type mentioned in the precharacterizing clause of claim 1 in such a way that additional information about the traffic can be obtained. In particular, it is intended that this system should be inexpensive and simple to manufacture.

According to the invention, this object is achieved in the case of a system of the type recited in the claims.

The starting point for the invention is the basic idea of employing propagation time distance measuring devices operating by reflection, in order to interrogate transceivers which have stored traffic information. In the USA, a large percentage of the motor vehicles manufactured are already equipped with such distance measuring devices.

Widely-used propagation time distance measuring devices operate using optical pulse signals. In the case of the system according to the invention, therefore, the transceivers in which the traffic information is stored are also optoelectronic transceivers, in particular so-called optoelectric transponders. These transceivers are designated stationary transceivers in the following text.

It is assumed that an optical pulse signal is emitted by a transceiver fitted on a vehicle and is incident on a vehicle traveling in front and on a stationary transceiver set up at the edge of the street. The optical pulse signal reflected from the vehicle traveling in front returns back to the transceiver on the vehicle side after a specific time duration. The time duration depends essentially on the distance between the emitting vehicle and the vehicle traveling in front. Influences of a relative speed between the two vehicles on the distance measurement result are of secondary importance.

The optical pulse signal for distance measurement which is emitted by the transceiver on the vehicle side is also incident on the stationary transceiver and is received and encoded by the latter and is emitted as an encoded optical pulse signal train and picked up by the transceiver on the vehicle side. If the distance between the emitting vehicle and the stationary transceiver is less than the distance to the vehicle traveling in front, the optical pulse train signal sent back by the stationary transceiver arrives before the signal which has been reflected by the vehicle traveling in front. In consequence, the distance between the emitting vehicle and the stationary transceiver is interpreted as the distance to the vehicle traveling in front. A false distance measurement would thus be obtained.

According to the invention, in order to avoid the risk of such a faulty distance measurement, provision is made for the stationary transceiver to emit its encoded optical pulse signal train only following the expiry of a predetermined delay time. This delay time is intended to be sufficiently large that any distance measurement carried out has reliably been completed before the stationary transceiver emits its encoded optical pulse signal. This also means that the delay time depends on the efficiency of the propagation time distance measuring device, that is to say what maximum distances can be measured in what time.

Advantageous developments of the subject matter of the invention are specified in the claims.

According to an advantageous development of the invention, infrared light is used for the optical pulse signals. According to another advantageous development of the invention, the second transceiver is an optoelectric, preferably passive, transponder.

According to a further advantageous refinement of the invention, the second transceiver is fitted to a traffic sign.

An advantageous development of the invention is distinguished by the fact that the first signal emitted by the first transceiver is encoded and is decoded in the second transceiver, and in that the encoded second signal is emitted by the second transceiver as a function of the code of the encoded first signal. The code of the encoded first signal is a code which is specific for a specific type of vehicle.

If, for example, the transceiver on the vehicle side is fitted to a goods vehicle, the signal emitted by this transceiver may have a coding which is assigned to "goods vehicles". A traffic sign which contains information relating only to goods vehicles, for example in the case of inclines, a speed restriction which applies only to goods vehicles, may have a transceiver which has a "goods vehicles" internal coding. If this transceiver receives the "goods vehicle" encoded signal, it emits an information signal, since there is an assignment of the code, which signal is received by the first transceiver. If the transceiver on the vehicle side emits a signal which does not have a "goods vehicle" code, no optical information signal is emitted by the second transceiver either.

The information obtained from a second or stationary transceiver is expediently displayed for the vehicle driver in an identifiable manner on a visual display. Other types of display, such as a speech display, are likewise possible. It is also possible, as is known, to derive from the signal, which has been received by the transceiver on the vehicle side, a control signal with which an intervention can be made in the mode of operation of the motor vehicle engine.

BRIEF DESCRIPTION OF THE DRAWINGS

The subject matter of the invention will be explained in more detail below, using exemplary embodiments, with reference to the drawings, in which:

FIG. 4 shows a schematic, graphic representation of the signals received by the transceiver on the side of the motor vehicle in the case of the distance measurement carried out in the street traffic situation shown in FIG. 1.

DETAILED DESCRIPTION OF THE PREFERRED EMBODIMENT

Figure 1:
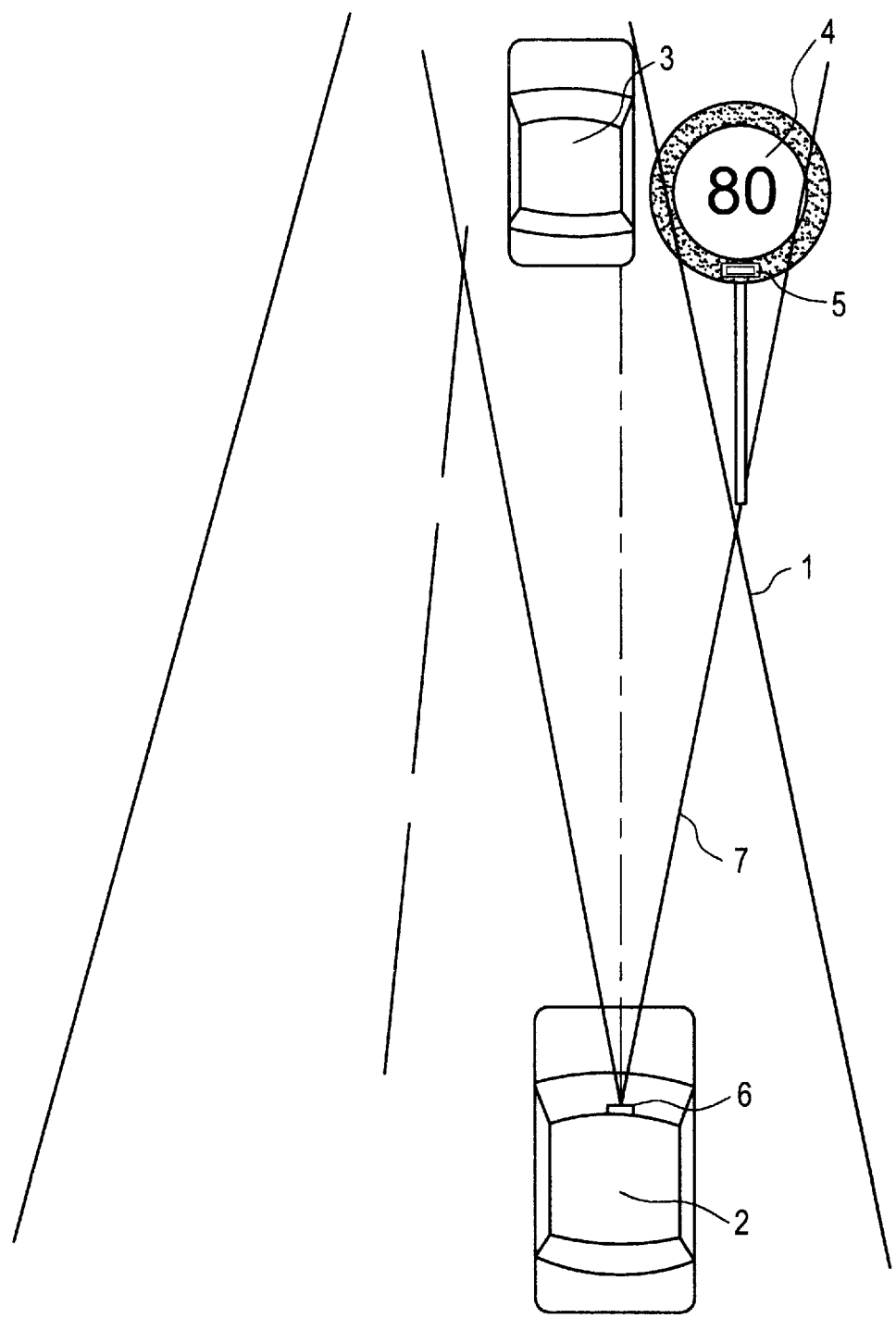
FIG. 1 shows a road traffic situation with two automobiles and a speed restriction traffic sign equipped with a transceiver.

FIG. 1 shows a street traffic situation in which a first automobile 2 is located on the right lane of a street 1. A second automobile 3 is traveling in front of the first automobile 2 in the same lane. Set up on the right-hand side of the street 1 is a traffic sign 4 which specifies a speed restriction of 80 km/h. The traffic sign 4 is located high up between the first automobile 2 and the second automobile 3.

The first automobile 2 is equipped with a transceiver 6, which is designed as a distance measuring device. The distance measurement is carried out via a propagation time measured between the emission of a measuring signal and the reception of a signal reflected at a target. An optical pulse signal is emitted by the distance measuring device 6 used here. The measuring beam has a range of about 200 m and an aperture angle of 3°.

Fitted to the traffic sign 4 is a transceiver 5 which is preferably an optoelectric transponder. When the latter has an interrogation signal applied to it, it emits a reply signal provided with a coding. In general, the energy contained in the interrogation signal is sufficient to generate the reply signal. If necessary, it is possible to equip the transponder 5 with a battery, in particular a photocell, which produces electric energy which is stored in a store, for example a capacitor.

Figure 2:
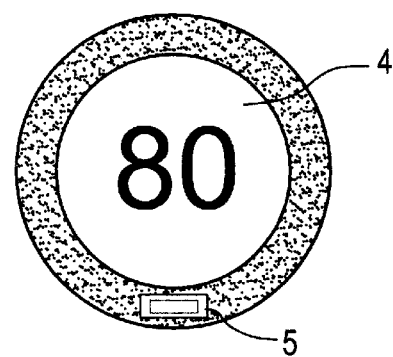
FIG. 2 shows the traffic sign in FIG. 1 on a larger scale.
Figure 3:
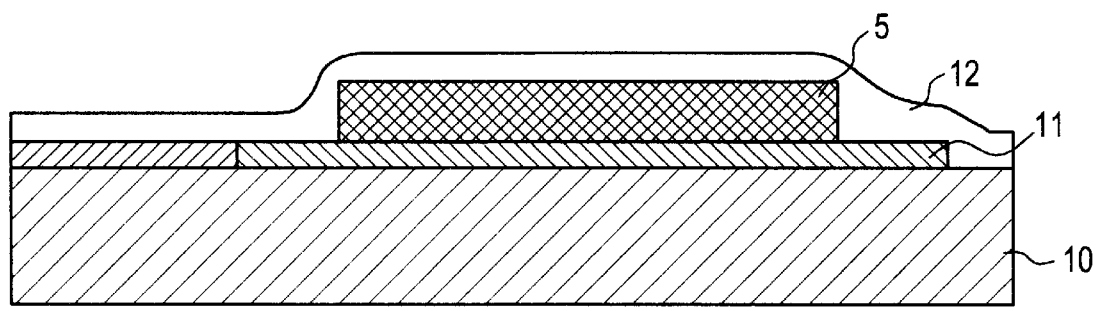
FIG. 3 shows a schematic sectional view through the street traffic sign in the region of the transceiver fitted to the traffic sign.

FIG. 3 shows a schematic sectional representation through the edge portion of the traffic sign 4 shown in FIG. 2, in which the optoelectric transponder 5 is located.

According to FIG. 3, a metal support 10 has a colored coating or film 11 applied to it. At this location corresponding to the red circumferential border of the traffic sign 4, the coating or film 11 is colored red. The optoelectronic transponder 5 is fitted on the coating 11.

For the purposes of protection, either the entire traffic sign or only that portion where the optoelectric transponder 5 is located may be covered with a transparent protective film 12. In the region of the optoelectric transponder 5, the protective film 12 must be transparent to the wavelength range of the optical pulse signals used.

If a distance measurement is now intended to be carried out from the first automobile 2, an optical pulse signal 7 is emitted by the transceiver 6 on the vehicle side. As already mentioned, this pulse signal has an aperture angle of about 3° and, as is shown in FIG. 1, registers at long range on the one hand the second automobile 3 traveling in front and on the other hand the traffic sign 4, in particular the region of the optoelectric transponder 5. At close range, however, only the vehicle traveling in front is registered, so that the transponder 5 is no longer prompted to emit its information signal. The energy of the optical pulse signals 7 and the aperture angle of the signal beam determine the distant range in which, on the one hand, the transponder 5 can be triggered and from which, on the other hand, it is also possible to receive only information signals from the transceiver 6. As can be seen, this is also true for vehicles traveling behind, so that their distance measurement to the vehicle traveling in front cannot be interfered with by information signals which are triggered by the vehicle traveling in front.

By way of example, with the emission of the measuring signal in the transceiver 6 on the vehicle side, a counter is enabled which begins to count clock signals. The optical pulse signal 7 emitted by the transceiver 6 is reflected from the second automobile 3 traveling in front and the reflected signal is received by the transceiver 6 of the first automobile 2. This received signal interrupts the counting of the clock pulses by the counter. The count value is thus a variable from which the distance between the two automobiles can be calculated.

Shown schematically in FIG. 4 is a timing diagram for the signals obtained from the receiving part of the transceiver 6 of the first automobile 2. The time is plotted on the abscissa axis and the pulse amplitude A is plotted on the ordinate axis. The optical pulse signal, emitted at time t0, is received as reflected signal at a time t1. If any device constant and relative speed between the two automobiles is neglected, then the time t1 is directly proportional to the distance between the first automobile 2 and the second automobile 3.

The optical pulse signal emitted for the purpose of distance measurement was also applied to the optoelectric transponder 5 which is fitted to the traffic sign 4. The optoelectric transponder 5 is designed in a special way such that, between the reception of an optical pulse signal for the purpose of interrogating the information contained in the transponder and the emission of the optical pulse signal, which is encoded in accordance with this information, a predetermined delay time is provided in order to avoid an erroneous distance measurement.

It can be seen in FIG. 4 that this encoded optical pulse signal from the transponder 5 has only been received by the transceiver 6 on the vehicle side after the expiry of the delay time t2. At this time t2, the distance measurement in the time interval predetermined by the distance measurement window 8 has certainly already been completed. The interruption lines in the signal representation and on the time axis are intended to make clear the actual distance in time from the time interval provided for the information measuring widow 9.

Without such a delay time, there is the risk that an erroneous distance measurement will be carried out. The optical pulse signal for the distance measurement is also at the same time the signal for the interrogation of the optoelectric transponder. In the case of the traffic situation shown in FIG. 1, if the second vehicle 3 is a relatively far, while the distance to the traffic sign 4 is significantly shorter, the situation may then occur where the optical pulse signal emitted by the optoelectric transponder 5 is received at an earlier point in time by the receiving part of the transceiver 6 of the first automobile 2 than the signal reflected by the second automobile 3. There is therefore the risk that this signal will be interpreted as the signal reflected by the second automobile 3. Consequently, an erroneous distance measurement would be obtained for the second automobile 3.

The delay time provided in the case of the optoelectric transponder 5 is therefore greater than the maximum time duration which is necessary for a distance measurement. In a practical case, about 2 $\mu$s are needed for a distance measurement of up to, for example, 200 m. If optical pulse signals are emitted at a clock frequency of 50 $\mu$s, about 48 $\mu$s would be available for the interrogation of the optoelectric transponder 5, during which time the receiving part is normally switched off. If the delay time is fixed at about 20 $\mu$s, a collision with data obtained from a distance measurement is then excluded. In the case of an aperture angle of the pulse signal 7 of 3°, it is also ensured that a transponder fitted on a traffic sign at a distance of 200 m is reached by the pulse signal 7. Since the transponder 5 is mounted in the viewing direction towards the vehicle, the result is also a direct assignment to the direction of travel and hence a low susceptibility to interference.

Expediently, there is in the vehicle, which is equipped with a transceiver both for distance measurement and for the interrogation of stationary transceivers in relation to traffic information, a device for the acoustic or visual statement of the information and measurement results obtained. A visual display can be carried out by means of a display device having liquid crystals. An acoustic display could be carried out with the aid of synthetic speech.

The accuracy of the distance measurement can be increased if a multiplicity of distance measurements is carried out. For this, it is advantageous to use the distance measurement method which is described in EP-B-0 312 524. This document has already been cited in the background.

I claim:

1. A traffic information system, comprising:
   a first transceiver disposed on a vehicle travelling on a road, the first transceiver configured as an optical transceiver for outputting an optical signal for determining a relative distance to another vehicle based on reflection of the optical signal off said other vehicle so as to cause a reflected signal that is received by the first transceiver; and
   a second transceiver disposed on an object on a side of the road, the second transceiver configured as an optical transceiver for receiving the optical signal and delaying outputting a reply signal back to the first transceiver until at least a predetermined period of time after receiving the optical signal,
   wherein the predetermined period of time is greater than a second period of time during which the reflected signal is capable of being received from the another vehicle at a predetermined maximum distance away from the vehicle.

2. A traffic information system of claim 1, wherein the reply signal contains data related to traffic information.

3. A traffic information system of claim 1, wherein the second transceiver is disposed on a sign located on the side of the road.

* * * * *